March 10, 1970 J. V. GIBBONS ET AL 3,500,379

POSITION-TO-SIGNAL ENCODER

Filed Nov. 23, 1964 2 Sheets-Sheet 1

William E. Fletcher,
Jerry V. Gibbons,
David N. Keast,
Robert I. Morefield,
INVENTORS.
BY.

Golove & Kleinberg,
ATTORNEYS.

March 10, 1970 J. V. GIBBONS ET AL 3,500,379

POSITION-TO-SIGNAL ENCODER

Filed Nov. 23, 1964 2 Sheets-Sheet 2

William E. Fletcher,
Jerry V. Gibbons,
David N. Keast,
Robert I. Morefield,
INVENTORS.
BY.

Golove & Kleinberg,
ATTORNEYS.

United States Patent Office 3,500,379
Patented Mar. 10, 1970

3,500,379
POSITION-TO-SIGNAL ENCODER
Jerry V. Gibbons, 1715 Lucile Ave., Los Angeles, Calif. 90026; Robert I. Morefield, 406 E. California, Arcadia, Calif. 91006; William E. Fletcher, 48 Bartlett St., Watertown, Mass. 02172; and David N. Keast, Los Angeles, Calif. (5331 Hinton Ave., Woodland Hills, Calif. 91364)
Filed Nov. 23, 1964, Ser. No. 420,238
Int. Cl. H04l 3/00; H03k 13/00
U.S. Cl. 340—347 10 Claims

ABSTRACT OF THE DISCLOSURE

A manually operated, relative position to analog encoder, having an extensible arm which is pivotally mounted. The arm is coupled to a pair of potentiometers providing a first signal proportional to the extension of the arm and a second signal proportional to the angular rotation of the arm. These signals are digitized into binary coded signals by an analog-digital converter.

This invention relates to a digital computer input device and, more particularly to a manually operated, relative position-to-digital encoder, adapted to provide an asynchronous input to a digital computer.

In using high speed, digital computing devices, it is necessary to enter information into the device. As is well known, there are many conventional methods of providing data to digital computers such as punched cards, punched tapes, magnetic tape and even manually operated keyboards. However, all of these media are suitable only when the information to be entered into the computer exists in a numerical form or is provided from transducers whose output can readily be converted into digital form for subsequent entry into the computer.

If, however, the desired information exists only in the form of a graph or curve plotted in Cartesian coordinates on a suitably scaled record, which may, in turn, be the output of some other data processing device, then there is no convenient, inexpensive method for converting this data into a form readily accepted by the computer.

In many areas of scientific investigation, all of the raw data initially acquired is, at the first instance, reduced to graphical form as the quickest, least expensive way of preserving the information. Such graphs can be created by photographic processes, by the use of a pen on paper, or by many other commonly available devices which provide a graphic, analog-type record as opposed to a numerical record.

In the prior art, in order to convert such graphic data to a form suitable for use within a digital computer, the curves were analyzed, point by point, and each point was identified by its Cartesian coordinates. This coordinate information, in numerical form, was encoded for presentation to the computer.

Servo controlled curve followers have also been provided which, through the use of sensors, track the curve itself and provide output signals which can be quantized into numbers representing displacements in orthogonal directions from a common origin. Some automatic systems use photo sensors while others use a manually operated pointer that is "tracked" by a servo system that moves beneath the working surface. In both, the "position" of the servo system can be quantized and transmitted.

A pair of cursors, each representing one of the orthogonal coordinates, requiring an operator to manipulate a pair of knobs or controls, maintains registration with a projected image or possibly with the curve directly and the relative positions of the cursors is quantized. However, such an operation usually requires great care and skill, and is invariably done in sequential fashion to achieve any degree of accuracy. Yet another system utilizes an electrical gradient over a surface which is measured by alternately energizing the surface in the "X" and "Y" directions and detecting the potential with a probe.

What has been needed, and what has been provided by the present invention is a simple, manually operable device, which can be used by an operator to follow or trace a curve and which will simultaneously provide a digitized output, corresponding to the orthogonal coordinates of each point on the curve in sequence. Through the use of high speed computation techniques and high speed digitizing circuitry, the device operates in "real time" and can provide, in digital form, signals representing the numbers corresponding to the coordinate location of each point tracked by the operator.

According to a preferred embodiment of the present invention, an extensible arm is pivotally mounted at a reference point and is used to manually trace a given curve. The arm is coupled with a pair of potentiometer devices, a rotatable potentiometer which is controlled by the rotation of the arm about its pivot point and a linear potentiometer which is controlled by the extending or retracting of the arm relative to the pivot point. Alternatively, the linear potentiometer can be replaced with a second rotatable potentiometer connected to a tape so that linear motion is converted directly to rotary motion. The data-capturing portion of this invention might be best compared to a radius-angle or rho-theta signal generator device which provides digitized rho-theta information to a digital computer. The computer, in turn, can easily perform a coordinate transformation to recover the information in an X–Y, Cartesian, orthogonal coordinate system. In order to enable the coordinate conversion, initial readings must be taken to determine, in the X–Y coordinate system of the graph being read, the rho-theta equivalent to maximum Y displacement and minimum X displacement, the rho-theta coordinates corresponding to the "origin" or X and Y minimum values and, finally, the rho-theta coordinates corresponding to a maximum X value and a minimum Y value.

At a predetermined clock rate, the instantaneous rho-theta analog signals, derived from the potentiometers, are converted in an analog-to-digital conversion network to provide, in a staticizer, a plurality of digital bits representing, in a preferred embodiment, the straight binary equivalent of the quantity represented by the analog voltage. These conversions are performed on the analog signals provided by both the rotational potentiometer corresponding to "theta" or angle and the linear potentiometer corresponding to "rho" or radius. The output of the digital staticizer, can then be applied directly to a digital computer, or alternatively, can be recorded in some other form which can ultimately be used to provide a data input to the computer.

In the preferred embodiment, a paper tape punch is driven from the staticizer to provide a binary-coded, paper tape input which can later be used as a computer input. In other, alternative embodiments, the same information can be taken from the staticizer and stored in a magnetic memory, magnetic tape, or can be used to drive a printer, should a raw, numerical presentation be desired.

A logical gating network is provided including a plurality of bi-stable storage devices for stepping the apparatus of the present invention through a plurality of different, operational phases. During each set of phases or cycle the circuits operate in response to the position of the stylus to provide specific information, suitably identified. In a typical cycle, a multi-position switch is used to identify the initial, coordinate-correlating information. First, the position of the stylus at the maximum vertical displacement of the graph is recorded and converted into digital form; next the position corresponding to the graph "origin" is recorded; and, finally, the position corresponding to maximum horizontal displacement is recorded. From that point on, the apparatus continually converts stylus position as a function of rho-theta potentimeter voltages into binary numbers, representing, in digital form, the rho-theta displacements from the pivot point and these binary digits can be used as the basis to generate a permanent record. The computer can apply the necessary coordinate conversions to recover the data in "X–Y" form.

The analog-to-digital code conversion is performed using a buffer amplifier, a precision voltage generating network, and a comparator circuit. The precision voltage generating network is controlled by a plurality of flip-flop circuits which are connected as a counter and which are driven by clock pulses from a timing generator that are gated by the comparator output. The code conversion flip-flops are so connected, that so long as the comparator indicates an unbalance as between the unknown voltage from the potentiometer and the known voltage generated from the flip-flop conduction state combination, the conduction state combinations of the flip-flops are changed until the comparator output does indicate agreement. At this point, the conductive state combination of the flip-flops represents, in binary code, a number whose magnitude corresponds to the magnitude of the analog output signal provided from the particular potentiometer.

The conduction states of the flip-flops in the analog-to-digital converter circuit representing a binary number are transferred to a bank of buffer flip-flops which is connected as a shift register and performs a serial to parallel conversion to drive the output device, directly. In a preferred embodiment, eleven flip-flops are used in the code conversion process so that each rho-theta value is represented by a voltage which is converted to an eleven bit binary number. This number is shifted into the buffer shift register. The six most significant bits are then applied to the output device in parallel and these six bits are then shifted serially out of the register. The remaining five bits are now located in the first through fifth most significant bit locations and these five bits are then read out in parallel into the output device.

In the preferred embodiment, the output device is a paper tape or card punch which can accept six bits in parallel to punch a row of characters in six columns with additional columns utilized for parity and other special functions. During an operating cycle, in the preferred embodiment, the rho information is staticized first and applied to the output device. Next, the theta information is quantized and, it too, is applied to the output device.

Accordingly, it is an object of the present invention to provide an improved data input device for electronic data processing equipment.

It is yet another object of the present invention to provide an improved apparatus for converting data represented by a curve on a graph on to a form acceptable by high speed electronic data processors.

It is still another object of the invention to provide an improved analog-to-analog converter for representing a point on a curve as a pair of voltages.

It is yet another object of invention to provide an improved data input device for converting information represented as a curve on a graph into a plurality of discrete pairs of electrical signals, each pair corresponding respectively to a different point on the graph.

It is yet a further object of invention to provide an improved input data device for a high speed electronic data processor which provides electrical signals respectively representing radial and angular displacements from a predetermined origin of the point on a given curve representing input data.

It is still another object of invention to provide an improved data entry means for electronic data processors which include a manually operated stylus that is adapted to provide a pair of electrical signals respectively representing the coordinates of each point on a data representing graph.

It is still another object of invention to provide an improved coordinate transforming system in which data represented by a graph in Cartesian coordinates is converted into a pair of voltage signals representing the rho and theta components of a polar coordinate system having a predetermined remote origin.

It is still another object of invention to provide manually operable apparatus for manually tracing curves and for continuously generating voltage signals representing the polar coordinates of the curve relative to a predetermined origin.

It is yet another object of the present invention to provide an improved data input device that is manually operable to generate voltages representative of the coordinates in space of a series of points comprising a graphic curve and to provide apparatus for converting analog signals thus provided in digital form.

It is still another object of invention to provide a manually operable data input device that provides in digital data form, the coordinate location relative to predetermined indices, of the points comprising a curve representing input data.

The novel features which are believed to be characteristic of the invention, both as to organization and method of operation, together with further objects and advantages thereof will be better understood from the following description considered in connection with the accompanying drawings in which several preferred embodiments of the invention are illustrated by way of example. It is to expressly understood, however, that the drawings are for the purpose of illustration and description only and are not intended as a definition of the limits of the invention.

Figure 1:
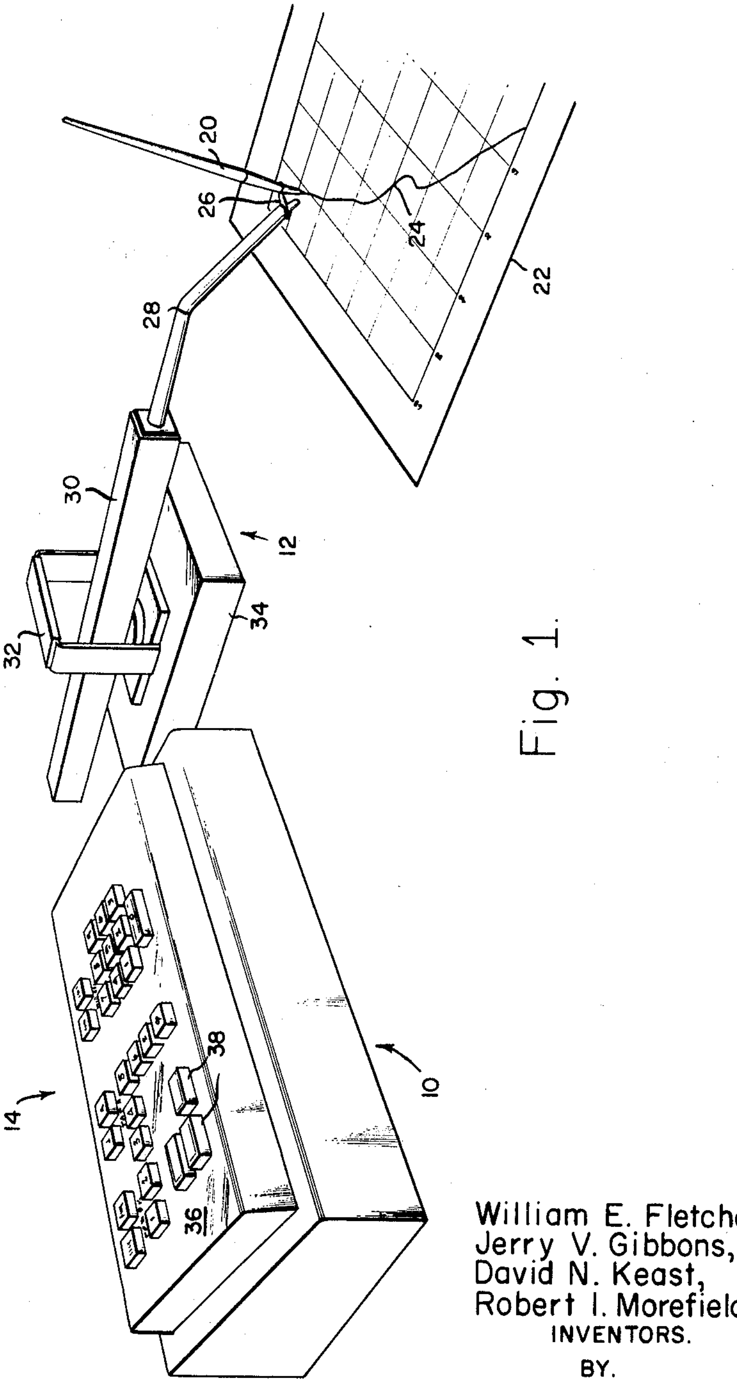
FIG. 1 is an isometric view of a manually operated data input device according to the present invention.

Turning first to FIG. 1, there is shown a data input system 10 according to the present invention. In the preferred embodiment, there is included a position-to-signal conversion unit 12, a digital data input unit 14 and signal-to-digital conversion circuits 16, not separately shown in FIG. 1.

The basic, data acquisition portion 18 of the unit includes a stylus 20 adapted to be manually operated in conjunction with a graphic record 22 which has, plotted thereon a curve 24 or other data representation representing a reduction of data to a graphic form which is to be digitized and presented as an input to an electronic data processing machine or digital computer. It is understood that the particular curve or graph from which data is to be recovered, may represent any data, drawn to any scale, since the present invention is primarily concerned only with the generation of signals that correspond to and represent the coordinates of the points making up the curve.

The stylus is connected by a suitable linkage 26 to an extensible arm 28, the position of which, through suitable mechanical linkages and electro-mechanical components, provides a unique signal corresponding thereto. As shown, the arm is constrained to move linearly in a fixed tube 30 which is pivotably mounted in a substantially U-shaped bracket 32. The U-shaped bracket 32 is itself rotatably mounted on a base 34. The fixed tube 30 may be considered as gimballed for two-degree of freedom movement, in that it is rotatable about a vertical axis and is also rotatable, to a limited extent about a horizontal axis that is orthogonal to the vertical axis.

The manually operated position-to-voltage unit 12 is electrically connected by suitable conductors (not shown) to the digital data input unit 14 which includes a keyboard 36 having a plurality of manually operable keys 38, each adapted to provide specific signals to a data processing device. For example, selected ones of the keys are adapted to provide unique signals identifying the concurrently provided signals of the position-to-signal encoder, as representing the "origin" of a particular graph, while other keys identify the limits of the abscissa and ordinate axes, respectively. Still other keys are adapted to provide coded representations of the numerical decimal digits 0 through 9.

In use, the stylus 20 is held in the hand of a human operator who then traces or follows the curve 24. It will be noted that for each point on the curve, there will be a unique combination of lateral extension of the arm 28 and rotation, in the horizontal plane, of the tube and support frame 32 relative to the base 34. Means, not shown in FIG. 1, are provided which supply a unique signal proportional to and representative of the position of the arm 28 and second means are provided to generate a signal proportional to and representative of the rotation of the arm 28 about its vertical axis.

It is also possible to consider each point contacted by the stylus 20 as one having unique coordinates in a polar coordinate system, whereby the position of the arm 28 represents rho or the radius and the rotational position of the gimbal assembly 32 relative to the base 34 represents theta or the angular displacement from a fixed point. It is obvious that any high speed data processing device is capable of performing a coordinate conversion from a rho-theta system having its center at the vertical axis of the tube 30, to the location of Cartesian or orthogonal coordinate system. The origin abscissa, and ordinate axes can be uniquely identified to the data processor in terms of their respective rho-theta coordinates and any point on the graph can be expressed in one form and transformed into the other.

In the preferred embodiment of the invention, therefore, the rho-theta coordinates of the origin are first presented as a voltage which is then quantized into digital form. Similarly, the maximum values of the ordinate and abscissa axes are also converted into a digital form. After the information necessary to transform the polar to Cartesian coordinates have been provided with the appropriate displacement of the origin, the polar coordinates of each point on the graph 24, represented as a pair of voltage signals respectively corresponding to a rho and a theta value, are converted into a digital form. The signals representing digits can be stored in a digital storage device or can be applied directly to a data processing or information handling system.

It is understood that the analog-to-digital conversion may be performed entirely within the data processor and that the stylus 20 and its associated arm and gimbal assembly may be considered a separable entity, independent of the system of the preferred embodiment. Analog-to-digital conversion devices are well known in the art and, accordingly, for ease of reader comprehension, such systems will not be described in particular detail, herein.

Figure 2:
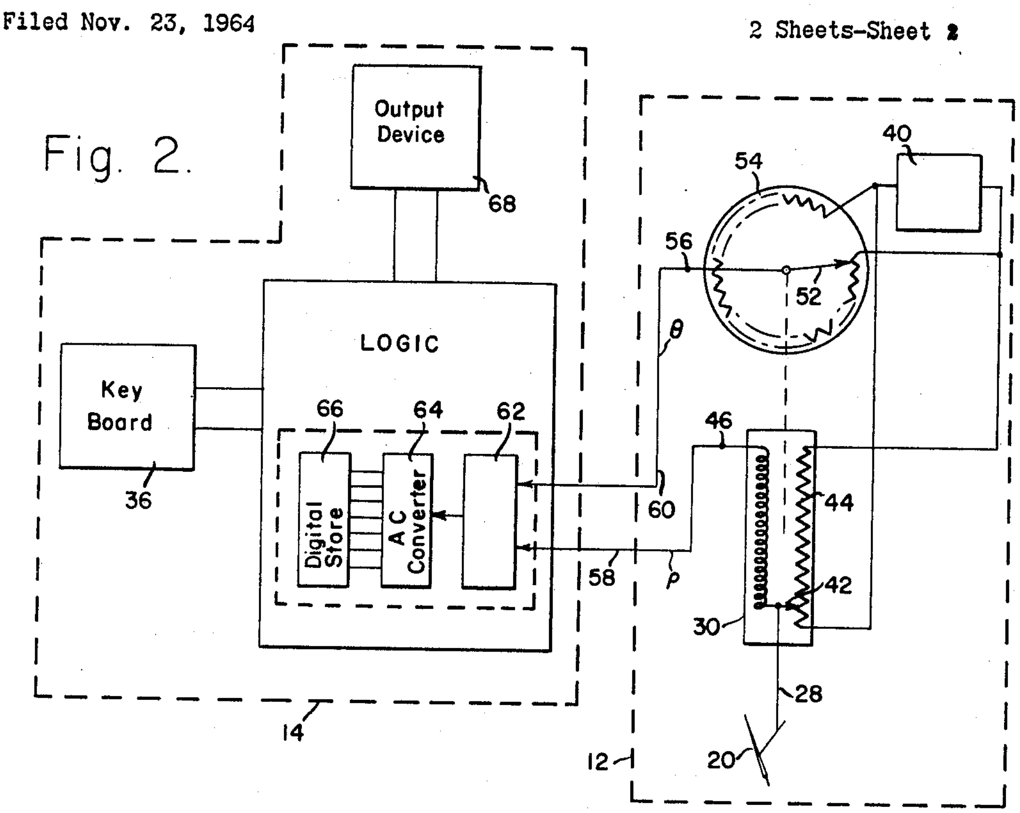
FIG. 2 is a block diagram of the principal elements of the input device of FIG. 1.

Turning next to FIG. 2, there is shown in block diagrammatic form a preferred embodiment of the present system showing the major components of the position-to-signal generating apparatus 12 and the digital data input equipment 14. The position-to-signal 12 portion of the system 10 is shown to comprise the mechanical elements described in greater detail in FIG. 1, above, and, in this embodiment, a pair of precision potentiometers, each of which is connected to a precision, highly regulated power supply 40.

The extensible arm 28 is arranged to carry the tap 42 of a precision, linear potentiometer 44, shown here wholly enclosed within the tube 30. The potentiometer 44 is connected to the precision power supply 40. In operation, the lateral position of the stylus 20 results in a unique contact point of the tap 42 which provides, at an output terminal 46, a voltage signal proportional to and representative of the lateral position of the arm 28, relative to the rotational axis.

To provide an indication of angular displacement theta, the gimbal assembly 32 is pivotably mounted on a rotating tap 52 of a precision, rotary potentiometer 54, the ends of which are connected to the power supply 40. At an output terminal 56, a voltage is provided which is at all times, proportional to and representative of the rotational position of the gimbal assembly. A pair of conductors 58, 60 are respectively connected to the potentiometer outputs 46, 56.

The digital data input device 14 accepts the signals on the conductors 58 and 60, respectively, representing the values of rho and theta. Through suitable logical selecting and programming unit 62, the rho and theta signals are applied to an analog-to-digital converter 64 which applies its output to a digital store 66. A conventional flip-flop storage register may be used for the digital store 66. The selection and programming unit 62 also controls the provision of information from either the digital store 66 or the keyboard 36 to an output device 68 which, in an "off-line" application can be paper tape perforator. It is possible however, in alternative embodiments, to apply the digital output directly to a utilization device, such as a high speed data processor.

In operation, as the stylus 20 is traced over a curve, during each interval of time as defined by suitable timing circuits the position of the taps 42 and 52 provide unique output voltages at the rho output terminal 36 and the theta output terminal 56. At a high rate of speed, substantially faster than the time required for the human operator to move from point to point, the rho voltage is converted to digital form and supplied to an output device. The theta value is also converted to a digital form and supplied to the output device.

During a complete cycle of operation, the digital output of the digital data input device 14 is more than adequate to handle the plotting of any curve by the human operator. Especially if the human operator wishes to maintain any degree of accuracy or fidelity of the trace, a reasonably, slow, deliberate tracing of the curve will provide rather slowly changing data in terms of the speed of operation in the digital data circuits.

Figure 3:
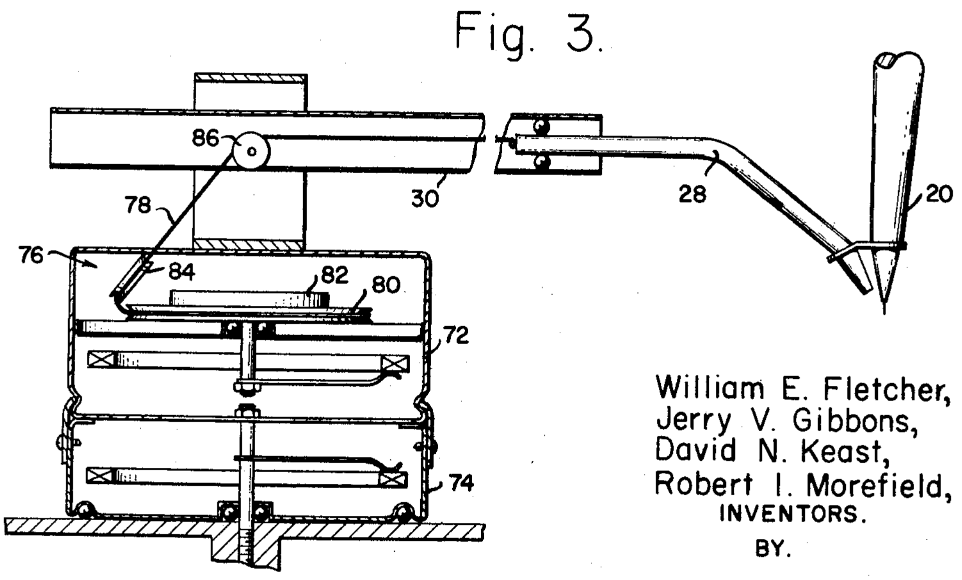
FIG. 3 is a side section view of an alternative stylus position-to-voltage conversion device.

In FIG. 3, there is shown an alternative structure for providing the rho and theta output voltages. The alternative structure of FIG. 3 utilizes a pair of precision rotary potentiometers 72, 74 to generate the rho and theta voltages. The extensible arm 28 is connected by means of a cable assembly 76 to rotate the wiper of a first potentiometer 72. One end of a cable 78 is mounted to rotate the wiper of the first rotatable potentiometer 72 and is wrapped about a reel 80 coupled to a torsion spring member 82. The cable 78 then extends over idler pulleys 84, 86 to a point of attachment with the extensible arm 28.

In operation, as the arm 28 is moved back and forth within the tube 30, the cable is mounted inelastically, and therefore converts the linear motion of the arm 28 to rotational motion of the potentiometer 72. It will then be obvious that each position of the arm 28 corresponds to a different impedance of the potentiometer 72 and therefore, the output remains a signal representative of the value of rho or the radius of the polar coordinate system whose origin is at the vertical axis of the gimbal assembly.

As in the preferred embodiment, the second precision potentiometer 74 is fixed to the gimbal assembly and provides the signal corresponding to the angular displacement from a given index point. The gimbal rotates the case and the wiper assembly is held fixed.

In still another embodiment, not shown here, a pair of linear potentiometers could be used to provide rho and theta information.

The rho or linear potentiometer assembly would be substantially as in the preferred embodiment and a second linear potentiometer could be driven by a cable assembly adapted to convert rotational motion to linear displacement. Accordingly, the present invention, in its broadest aspect provides means for signalling the coordinates in a first coordinate system of each point on the graph, which signals can be used in a coordinate transformation to locate the point with respect to any other coordinate system.

Clearly the origin of the first coordinate system need not coincide with the origin of the graph whose data is to be fed into the data processing system. It is also clear that the coordinate transformation can be accomplished in the data processor since this process is essentially a simple, mathematical one.

Thus, there has been provided an improved data input device for a high speed information system which converts information represented in a graphical form to electric signals representative of the coordinates of each point of the graph in a polar coordinate system. Through suitable analog-to-digital encoding circuits, which may be part of the information handling system, the graphical data is converted into numerical form together with such information as to the origin and axes of the graph to enable either the utilization of the information in polar coordinate form or the coordinate conversion to suitable Cartesian coordinates.

In the preferred embodiment, a precision linear potentiometer is used to provide signals representative of radius or rho displacement while a precision rotational potentiometer is used to provide signals representative of the angular or theta displacement. In an alternative embodiment, a cable assembly is used in conjunction with an extensible arm so that a pair of rotational potentiometers can be used to provide both the rho or radial information and the angular or theta information.

What is claimed as new is:

1. A position-to-signal device adapted to be connected to an electrical source for providing data input signals corresponding to and representative of the location of a remote point within a plane as a function of two coordinates comprising:

extensible and rotatable stylus means, connected to a predetermined reference point in space, for identifying a point whose coordinates are to be signalled;

first means including a single extensible arm connected to said stylus means and adapted to provide a first signal proportional to and representative of the linear displacement of said stylus means from the predetermined reference point; and second means connected to said first means and adapted to provide a second signal proportional to and representative of the angular displacement of said stylus means from a predetermined reference line that includes the predetermined reference point;

whereby the polar coordinates of the remote point are signalled by moving said stylus means into registration with said remote point, said first means signalling the radius, rho, and said second means signalling the angle theta.

2. The apparatus of claim 1 in which said first and second means include potentiometer means adapted to be connected to a potential source and whose impedance varies in proportion to the displacement measured whereby signals proportional to displacement can be generated.

3. The apparatus of claim 1 wherein said first means include a linear potentiometer and a movable tap connected to said stylus means whereby impedance is directly proportional to the linear displacement of said stylus means from the predetermined reference point.

4. The apparatus of claim 1 wherein said first means include a rotatable potentiometer and means coupled to said stylus means for rotating said potentiometer to provide an impedance that is directly proportional to the linear displacement of said stylus means from the predetermined reference point.

5. The apparatus of claim 1 wherein said second means include potentiometer means whose impedance is directly proportional to the angular displacement of said stylus means from a predetermined line which includes the predetermined reference point.

6. The apparatus of claim 1 wherein said second means include a rotatable potentiometer coupled to said stylus means and whose impedance is directly proportional to the angular displacement of said stylus means from a predetermined line which includes the predetermined reference point.

7. The apparatus of claim 1 wherein said second means include a linear potentiometer and movable tap means coupled to said stylus means whereby the impedance of said linear potentiometer is directly proportional to the angular displacement of said stylus means from a predetermined line which includes the predetermined reference point.

8. The apparatus of claim 1 further including analog-to-digital converting means coupled to said first and second means for providing a plurality of signals to represent in digital form the magnitude of the coordinate displacements signalled by said first and second means.

9. A position-to-signal encoding device for entering data represented by points on a graph into data processing apparatus comprising:

stylus means coupled to a fixed reference point and rotatable and extensible about said reference point, said stylus means being adapted to be manually placed at a position next adjacent each of the points constituting the graph sequentially;

first means including a single extensible arm connected to said stylus means and adapted to provide a first signal proportional to and representative of the linear displacement of said stylus means from the fixed reference point; and second means connected to said first means and adapted to provide a second signal proportional to and representative of the angular displacement of said stylus means from a predetermined line including the fixed reference point;

whereby signals are continuously provided, representative of and corresponding to the polar coordinates of said stylus means relative to the fixed reference point.

10. A position-to-signal device adapted to be connected to an electrical source for providing data input signals corresponding to and representative of the location of a remote point as a function of two coordinates comprising:

movable stylus means, connected to a predetermined reference point in space, for identifying a point whose coordinates are to be signalled;

first means connected to said stylus means and adapted to provide a first signal proportional to and representative of the linear displacement of said stylus means from the predetermined reference point;

second means connected to said first means and adapted to provide a second signal proportional to and representative of the angular displacement of said stylus means from a predetermined reference line that includes the predetermined reference point;

sequencing means connected to said first and second means for selectively providing first and second signals, alternatively, at an output terminal;

analog-to-digital converting means coupled to said sequencing means output terminal and operable in response to signals therefrom to generate a plurality of signals for representing in digital form, the magnitude of the signal applied thereto; and utilization means connected to said analog-to-digital conversion means to receive and store said plurality of signals representing in digital form, the rho and theta displacement, from the predetermined origin, of said movable stylus means next adjacent the remote point.

References Cited

UNITED STATES PATENTS

| | | | |
|---|---|---|---|
| 1,486,203 | 3/1924 | Thun | 33—122 |
| 2,191,730 | 2/1940 | Sjöstrand | 33—1 X |
| 3,253,273 | 5/1966 | Allen et al. | 340—347 |
| 3,298,015 | 1/1967 | Herman | 340—347 |
| 3,302,194 | 1/1967 | Green et al. | 340—347 |
| 3,303,491 | 2/1967 | Silverman | 340—347 |
| 3,346,724 | 10/1967 | Fuhrmeister et al. | 340—347 |

MAYNARD R. WILBUR, Primary Examiner

G. R. EDWARDS, Assistant Examiner

U.S. Cl. X.R.

33—1; 178—18